United States Patent
Maier et al.

(10) Patent No.: US 11,712,962 B2
(45) Date of Patent: Aug. 1, 2023

(54) UTILITY VEHICLE COOLING FAN INSTALLATION

(71) Applicant: AGCO International GmbH, Neuhausen (CH)

(72) Inventors: Thomas Maier, Unterthingau (DE); Erich Freytag, Sachsenried (DE)

(73) Assignee: AGCO International GmbH, Neuhausen (CH)

( * ) Notice: Subject to any disclaimer, the term of this patent is extended or adjusted under 35 U.S.C. 154(b) by 0 days.

(21) Appl. No.: 17/644,001

(22) Filed: Dec. 13, 2021

(65) Prior Publication Data

US 2022/0194213 A1 Jun. 23, 2022

(30) Foreign Application Priority Data

Dec. 21, 2020 (GB) ..................................... 2020277

(51) Int. Cl.
| | | |
|---|---|---|
| *B60K 11/06* | (2006.01) | |
| *B60K 11/04* | (2006.01) | |
| *B62D 25/12* | (2006.01) | |
| *B62D 49/00* | (2006.01) | |
| *F01P 1/00* | (2006.01) | |
| *F01P 11/10* | (2006.01) | |

(52) U.S. Cl.
CPC .............. *B60K 11/06* (2013.01); *B60K 11/04* (2013.01); *B62D 25/12* (2013.01); *B62D 49/00* (2013.01); *F01P 1/00* (2013.01); *F01P 11/10* (2013.01); *F01P 2070/50* (2013.01)

(58) Field of Classification Search
CPC ........ B60K 11/06; B60K 11/04; B62D 25/12; B62D 49/00; F01P 1/00; F01P 11/10; F01P 2070/50; F01P 5/02; F01P 2003/187; F01P 3/20; B60Y 2200/221
See application file for complete search history.

(56) References Cited

U.S. PATENT DOCUMENTS

| | | | |
|---|---|---|---|
| 8,960,342 B2 | 2/2015 | Werner | |
| 2005/0274491 A1* | 12/2005 | Evans | .................... B60K 11/02 |
| | | | 165/98 |
| 2012/0261202 A1* | 10/2012 | Bering | ..................... F01P 11/10 |
| | | | 180/68.1 |

FOREIGN PATENT DOCUMENTS

| | | |
|---|---|---|
| EP | 1 600 311 B1 | 8/2011 |
| EP | 2455248 A1 | 5/2012 |
| EP | 2626227 A1 | 8/2013 |
| FR | 2972968 A1 | 9/2012 |
| FR | 2942428 A1 | 1/2013 |
| JP | H06328952 A | 11/1994 |

(Continued)

OTHER PUBLICATIONS

UK Intellectual Property Office, Search Report for related UK Priority Application No. GB2020277.6, dated May 24, 2021.

(Continued)

*Primary Examiner* — Hung Q Nguyen

(57) ABSTRACT

A utility vehicle such as an agricultural tractor includes an engine, a heat exchanger, and a fan located under a hood. The hood is pivotable between a closed position and an open position. The fan is mounted to the hood such that, when in the closed position, the hood covers the engine and heat exchanger and the fan is positioned in an operable position to generate a cooling airstream through the heat exchanger. When the hood is in the open position, the fan is displaced from the operable position.

15 Claims, 6 Drawing Sheets

(56) References Cited

FOREIGN PATENT DOCUMENTS

WO     WO-2013087562 A1 *   6/2013    ............. B60K 11/04
WO        2016/012030 A1     1/2016

OTHER PUBLICATIONS

European Patent Office, European Search Report related to European Patent Application No. EP21205760, dated May 5, 2022, 2 pages.
European Patent Office, International Search Report related to European Patent Application No. EP21205760.8, dated May 16, 2022, 7 pages.

* cited by examiner

UTILITY VEHICLE COOLING FAN INSTALLATION

CROSS-REFERENCE TO RELATED APPLICATION

This application claims the benefit of the filing date of U.K. Patent Application GB2020277.6, "Utility Vehicle Cooling Fan Installation," filed Dec. 21, 2020, the entire disclosure of which is incorporated herein by reference.

TECHNICAL FIELD

The present application relates to cooling fan installations in utility vehicles, and particularly to cooling fans provided to generate an airstream through a heat exchanger underneath a hood of the vehicle.

BACKGROUND

Utility vehicles include, by way of example, agricultural, industrial and forestry tractors, and plant machinery. A utility vehicle typically includes an engine and a cooling system housed underneath a pivotable cover, which may be referred to as a 'hood' or a 'bonnet.' The hood serves to protect the engine and cooling system from the outside environment and the like. The cooling system typically comprises one or more heat exchangers (which may be referred to as 'radiators') and a cooling fan to generate a cooling airstream through the heat exchanger.

Utility tractors in particular typically include a cab supported upon a transaxle which includes a rear axle and a transmission casing as an integrated part. Typically, an engine casing is attached to the front of the transmission via a clutch housing, wherein the primary drive shaft runs from the engine to the transmission along a generally central and longitudinal axis. Front wheels are usually mounted to the chassis or engine casing by a front axle or independent suspension. In such arrangements, the hood is disposed in front of the cab and, as with many self-propelled vehicles, the cooling system is typically disposed forward of the engine to have access to an uninterrupted source of clean air through a grill in the front of the hood.

International Patent Publication WO 2016/012030 A1, "Cooling Arrangement on an Agricultural Vehicle," published Jan. 29, 2016, discloses an example of an agricultural tractor comprising a radiator and fan housed underneath a pivotable hood in front of the cab. The hood is pivotable between a closed position and an open position. When in the closed position, the hood covers the engine and heat exchanger. A seal is formed between the underside of the hood and a fan shroud when closed to define a low pressure compartment upstream of the fan and a high pressure compartment downstream of the fan. When the hood is in the open position, an operator can access the cooling system and engine for servicing.

Utility vehicles require regular servicing which often includes the need to clean the heat exchanger of particulate matter that builds up on the exterior surfaces, blocking the gaps between the fins and reducing the cooling efficiency. A pressurized air line may be used for such cleaning. Due to space constraints under the hood of utility vehicles, access to the active surface areas of the heat exchangers can be problematic. Known solutions include the provision to laterally slide the heat exchangers from an operable position for cleaning. However, moving the heat exchangers can be difficult and time consuming, sometimes requiring special tools.

In the field of agriculture in particular, machinery has increased in size (to benefit from economies of scale), and so too has the size of agricultural tractors required to power that machinery. Currently available models exceed 500 hp (horsepower) in power output. Larger engines demand larger cooling systems, and various attempts have been made to accommodate the larger components under the hood while limiting obstruction of the driver's forward field of vision.

Another drawback of larger cooling systems is the reduction in steering capability of the tractor. Wider cooling systems demand a wider hood, which in turn limits the angle at which steerable front wheels can reach.

There is, thus, a desire to ease the servicing of cooling systems under the hoods of utility vehicles. Moreover, there is a desire to reduce the impact on the steering range of utility vehicles caused by large cooling systems.

BRIEF SUMMARY

In some embodiments, a utility vehicle includes an engine, a heat exchanger operable to cool a fluid, a fan, and a hood arranged to pivot between a closed position and an open position. The fan is mounted to the hood, and when the hood is in the closed position, the hood covers the heat exchanger and the fan is positioned in an operable position to generate a cooling airstream through the heat exchanger. When the fan is in the open position, the fan is displaced from the operable position.

By mounting the fan to the hood, the fan is conveniently moved away from the heat exchanger as the hood is opened. Ease of access to the heat exchanger for servicing is significantly improved. With what is often the main obstruction to cleaning the heat exchangers moved out of the way, it follows that the task of cleaning the heat exchanger is considerably simplified, thus saving time and potentially avoiding the need for special tools.

The hood may be arranged to pivot around a transverse axis, for example by mounting the hood to a vehicle chassis or frame to which the engine and heat exchanger is also mounted. The hood may thus be raised into the open position from a lowered closed position. In such an arrangement the fan may be lifted away from the operable position, allowing for the fan to be kept clear of the operator during servicing of the heat exchanger and also allowing any debris built up on the fan, or on an attached shroud, to fall away by gravity.

In one embodiment, the utility vehicle has a chassis and a cab supported on the chassis. The engine and heat exchanger is supported on the chassis in front of the cab, and the hood is pivotally mounted to the chassis in front of the cab. Such an arrangement may be embodied in a utility tractor such as an agricultural, forestry or industrial tractor by way of example and lends itself to benefit particularly from the disclosed advantages because frequent cleaning of the heat exchangers is often required in such applications.

The fan may be disposed in front of the heat exchanger so that the cooling airstream can be in the same generally direction as the natural airflow created by forward movement of the vehicle, namely a generally rearward cleaning airstream. However, this does not preclude the cleaning airstream being in a different direction. Moreover, in alternative arrangements, the fan may be disposed behind or to one side of the heat exchanger.

In one embodiment, a chassis is carried on two front steerable wheels, and a portion of the hood is located between the two wheels when in the lowered position. In such an arrangement, the hood may include a top cover and two side covers attached to, and extending downwardly from, the top cover. The fan is mounted, and extends laterally, between the side covers. A front perforated grill may be positioned at the front of the vehicle extending laterally between the side covers and attached to either the chassis or the hood. A front air intake chamber may thus be defined by the side covers, top cover, chassis, and front grill, from where the air is drawn by the fan.

By mounting the fan to the hood so that it is raised with the hood, the profile of the hood below the fan need no longer be designed to provide clearance around the fan. As such, the hood, and particularly side covers of the hood, may taper laterally inward below and/or in front of the fan, which presents increased clearance for steerable wheels located laterally of the fan. In turn, and advantageously, the steering range of the vehicle can thus be increased because the swept envelope of the steerable wheels is partially disposed underneath and/or in front of the fan.

In one embodiment, the fan has a fan surround, which may include at least one of a shroud, housing, or frame. A seal may be disposed around the fan surround to abut the inside surface of the hood to prevent airflow between the fan surround and hood. The seal may form part of the attachment to secure the fan surround to the hood. A further seal may be provided along a bottom edge of the fan surround to seal with a frame or chassis member. In an embodiment, the fan surround is sealed around all edges to define a low pressure compartment and a high pressure compartment either side of the fan.

In another embodiment, a power supply line, such as an electric supply line or a hydraulic supply line, is conveniently connected to the fan to drive the rotational movement of the fan. The power supply line may be mounted to an inside surface of the hood. Advantageously, by mounting the pipes or cables required to drive the fan to the hood, the collection of dust and debris can be reduced.

In some embodiments, a utility vehicle includes a chassis, a cab supported on the chassis, and an engine compartment in front of the cabin in which is arranged an engine or other prime mover and a heat exchanger operable to cool a fluid. The utility vehicle has a hood pivotally mounted to the chassis in front of the cab, and the hood is arranged to pivot between a closed position and an open position. A fan is mounted to the hood. When the hood is in the closed position, the hood covers the heat exchanger and the fan is positioned in an operable position to generate a cooling airstream through the heat exchanger. When the hood is in the open position, the fan is displaced from the operable position. The utility vehicle may be an agricultural tractor.

This summary is provided to introduce a selection of concepts in a simplified form that are further described below in the Detailed Description. This summary is not intended to identify key features or essential features of the claimed subject matter, is not intended to describe each disclosed embodiment or every implementation of the claimed subject matter, and is not intended to be used as an aid in determining the scope of the claimed subject matter. Many other novel advantages, features, and relationships will become apparent as this description proceeds. The figures and the description that follow more particularly exemplify illustrative embodiments.

BRIEF DESCRIPTION OF THE DRAWINGS

Further advantages of the disclosure will become apparent from reading the following description of specific embodiments with reference to the appended drawings in which.

While the above-identified figures show embodiments of the disclosed subject matter, other embodiments are also contemplated, as noted in the disclosure. In all cases, this disclosure presents the disclosed subject matter by way of representation and not limitation. It should be understood that numerous other modifications and embodiments can be devised by those skilled in the art, which fall within the scope and spirit of the principles of this disclosure.

DETAILED DESCRIPTION

Relative and directional terms used herein, such as 'forward,' 'rearward,' 'transverse,' and 'lateral' are made with respect to a virtual longitudinal vehicle axis that extends parallel to a general forward direction of travel.

Figure 1:
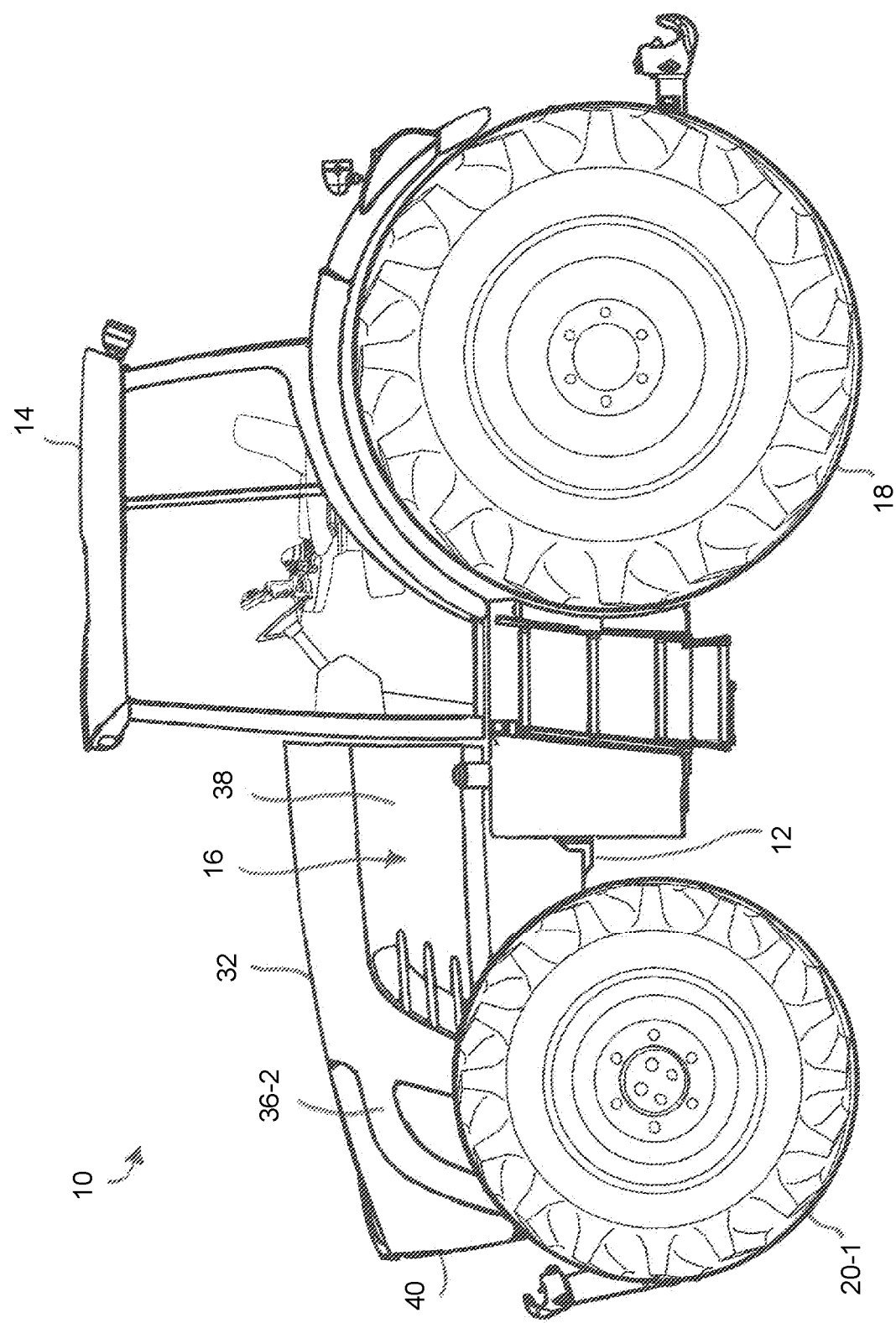
FIG. 1 is a schematic side view of an agricultural tractor in accordance with one embodiment.

With reference to FIG. 1, an agricultural tractor 10 comprises a frame or chassis 12 which includes a rear transaxle having a rear axle integrated with a transmission casing. A driver's cab 14 is mounted above and carried by the transaxle. An engine 16 (hidden from view but the position being designated generally at 16) is carried by, or forms an integral part of, the frame 12 and is disposed in front of the cab 14. In some embodiments, the engine 16 is housed by an engine casing which itself forms a load-bearing part of the frame 12, and which is attached to the front of the transmission casing of the transaxle as in known agricultural tractors.

A pair of rear wheels 18 are mounted to the rear transaxle. A pair of front wheels 20-1, 20-2 are mounted to either side the frame 12. In one embodiment, the front wheels 20-1, 20-2 are carried on a front axle mounted or suspended to the frame 12. In the illustrated embodiment however, the front wheels 20-1, 20-2 are independently suspended from the sides of the engine casing by respective dual wishbone suspensions 22-1, 22-2, for example, as disclosed in European Patent 1,600,311 B1, "Tractor with Front Suspension," granted Aug. 17, 2011.

Figure 6:
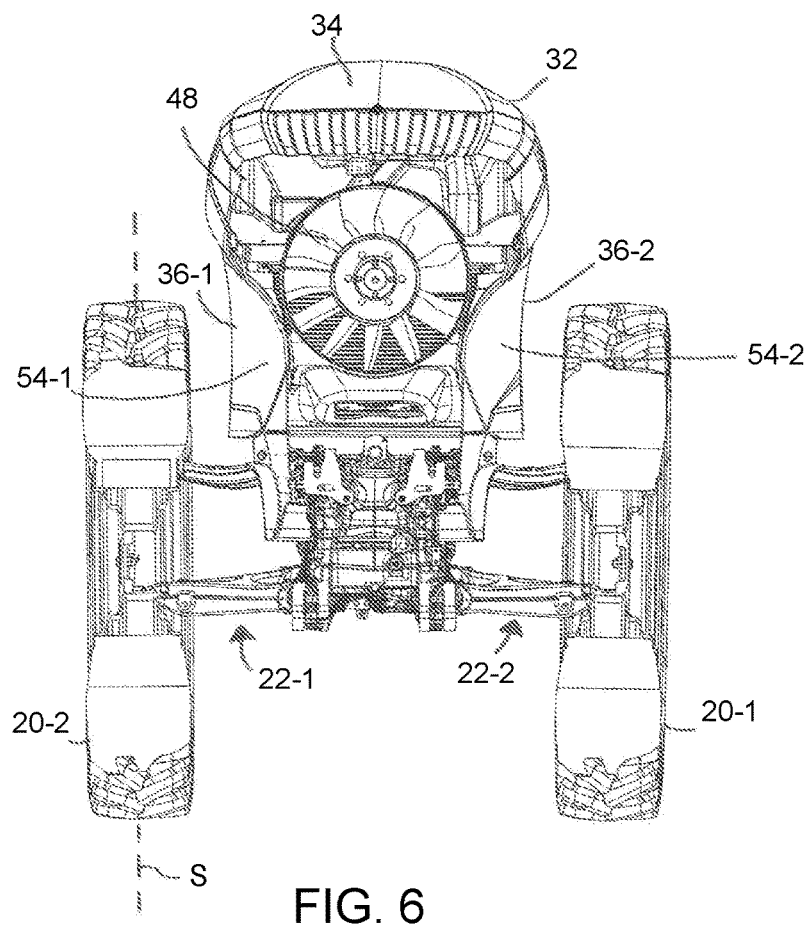
FIG. 6 is a view of a front view of a section taken through the plane of the fan of the front end installation of FIG. 4; and, FIG. 7 is a front view of the right-hand side of the front end installation of FIG. 4, showing the right-hand steerable wheel at full left-hand lock.

The front wheels 20-1, 20-2 are steerable about upright steering axes 'S' (one of which is indicated in FIG. 6) within a steering range that determines the maximum turning angle and thus the minimum turning radius of the tractor 10. The space occupied by the front wheels 20-1, 20-2 (including tires) through the steering range defines a swept envelope, which is discussed further below.

A cooling package 24 is mounted to the frame 12 in front of the engine 16. The cooling package 24 as shown comprises a set of heat exchangers, the set including an engine cooling radiator 26, an oil cooler 28 and an air conditioning condenser 30. It should be appreciated that the cooling package may comprise one or more heat exchangers, and those heat exchanger may be arranged in a number of different ways. In the illustrated embodiment, the oil cooler 28 is stacked above the condenser 30 in front of the engine cooling radiator 26.

The engine 16 and cooling package 24 together with exhaust components for example, form what is commonly referred to as the front end installation. In the illustrated embodiment, the cooling package 24 is positioned fore-and-aft so as to reside between the front wheels 20, and above the rotation axis of those front wheels 20.

Figure 2:
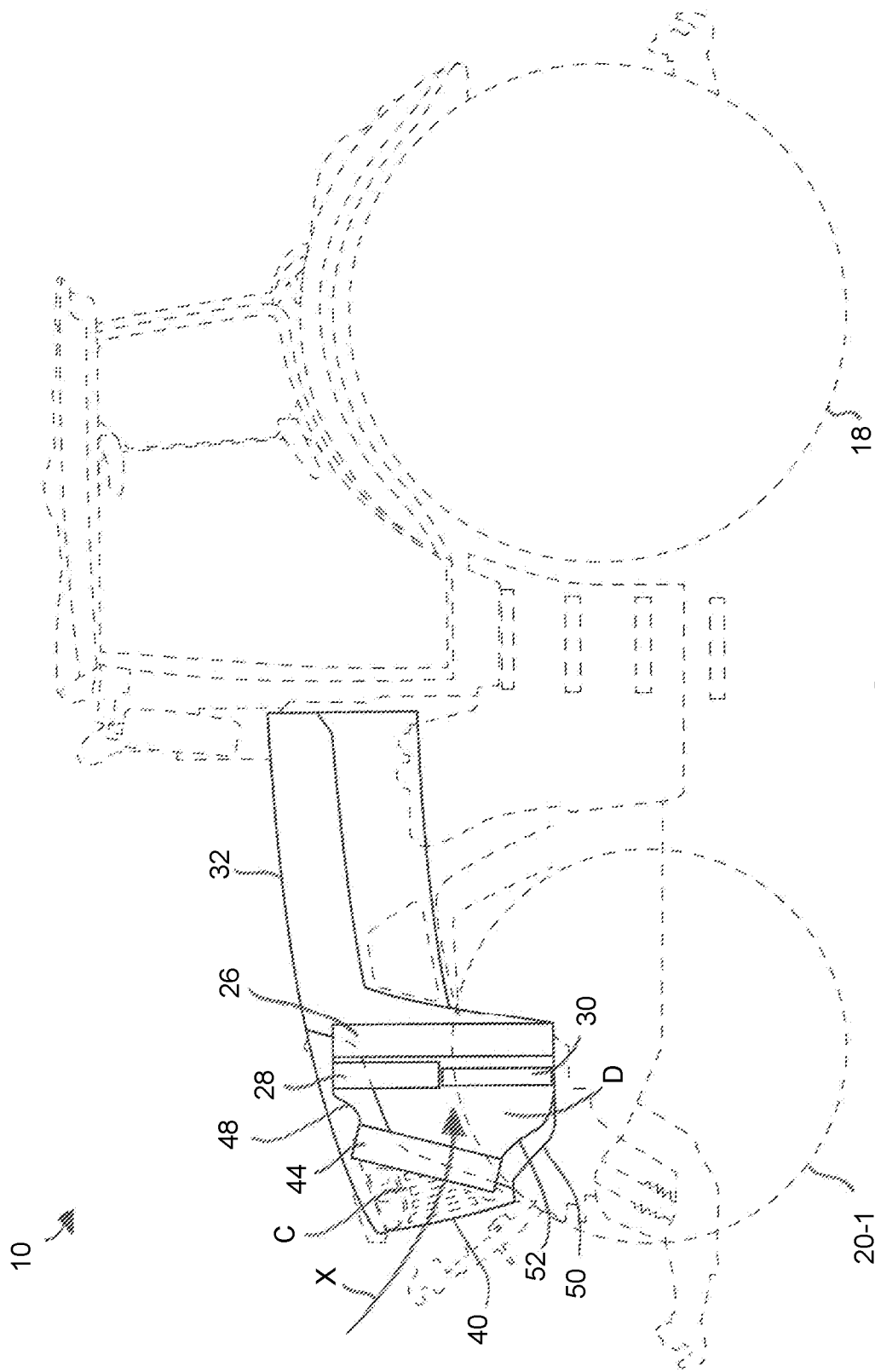
FIG. 2 is a schematic side view of the tractor of FIG. 1 with components of a cooling system revealed, showing the hood in a closed position.
Figure 3:
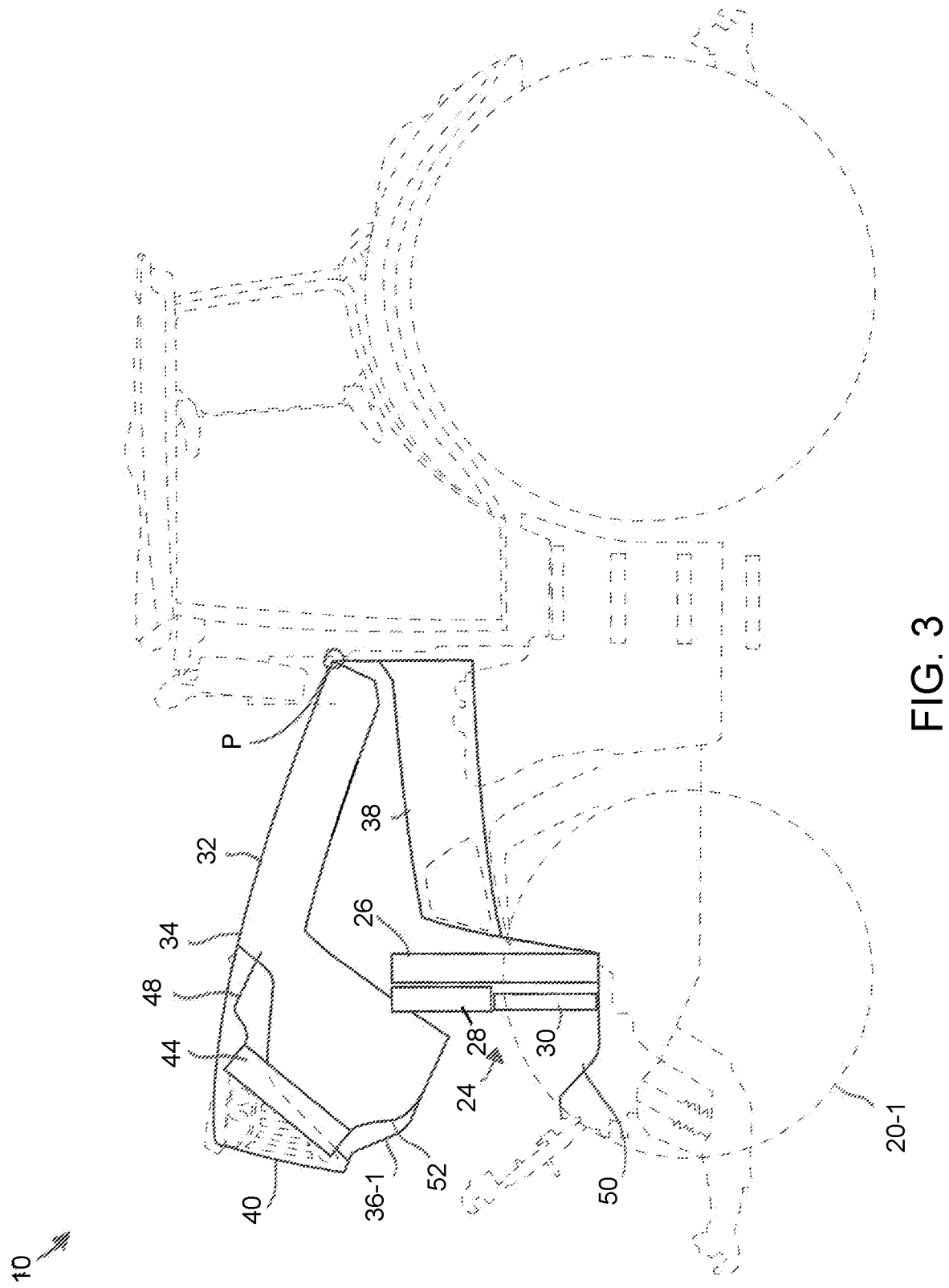
FIG. 3 is a schematic side view of the tractor of FIG. 2, but showing the hood in an open position.
Figure 4:
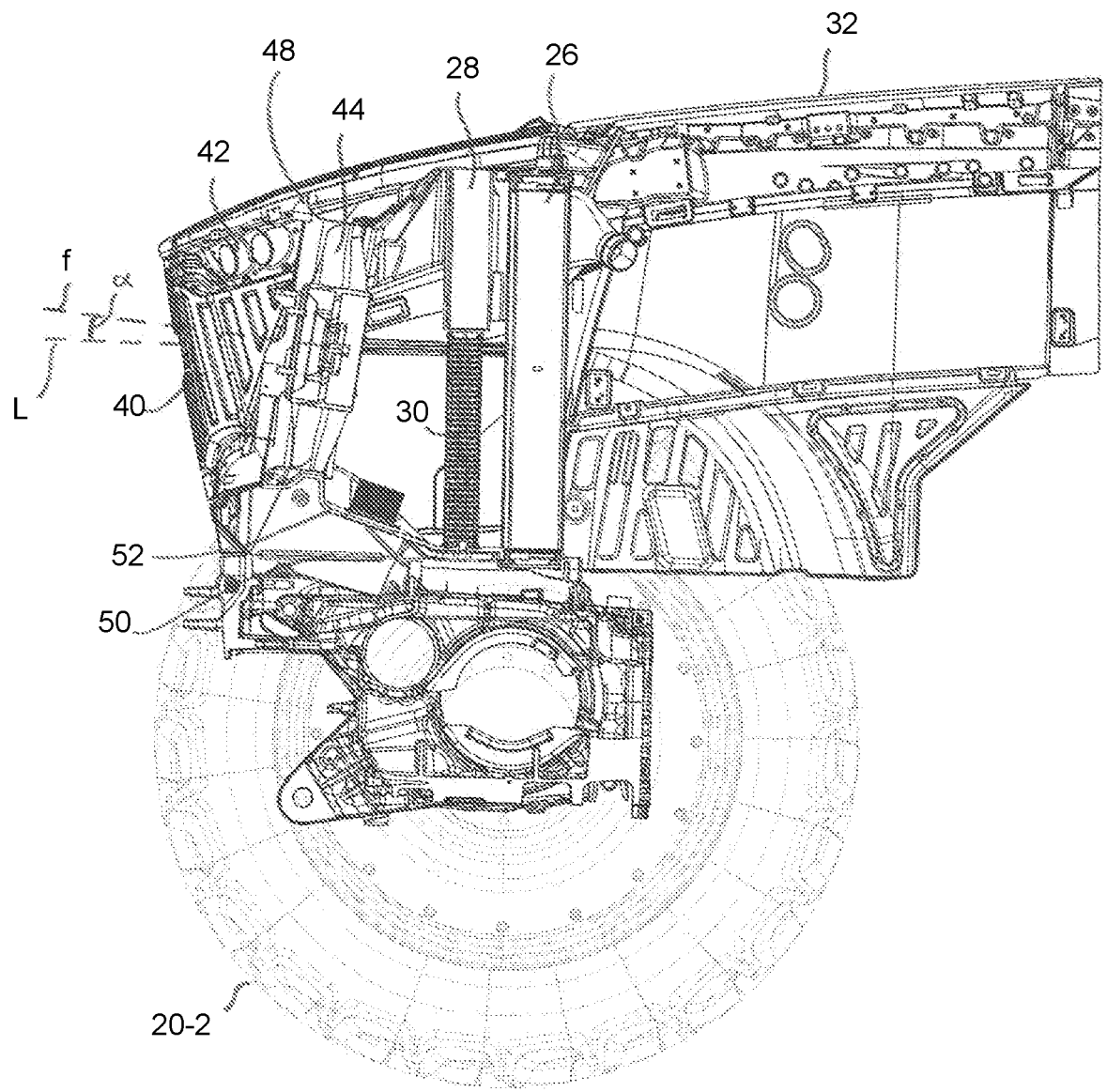
FIG. 4 is a side view of the front end installation of an agricultural tractor in accordance with another embodiment, with the left-hand side cut away through a vertical longitudinal section and showing the hood in a closed position.
Figure 5:
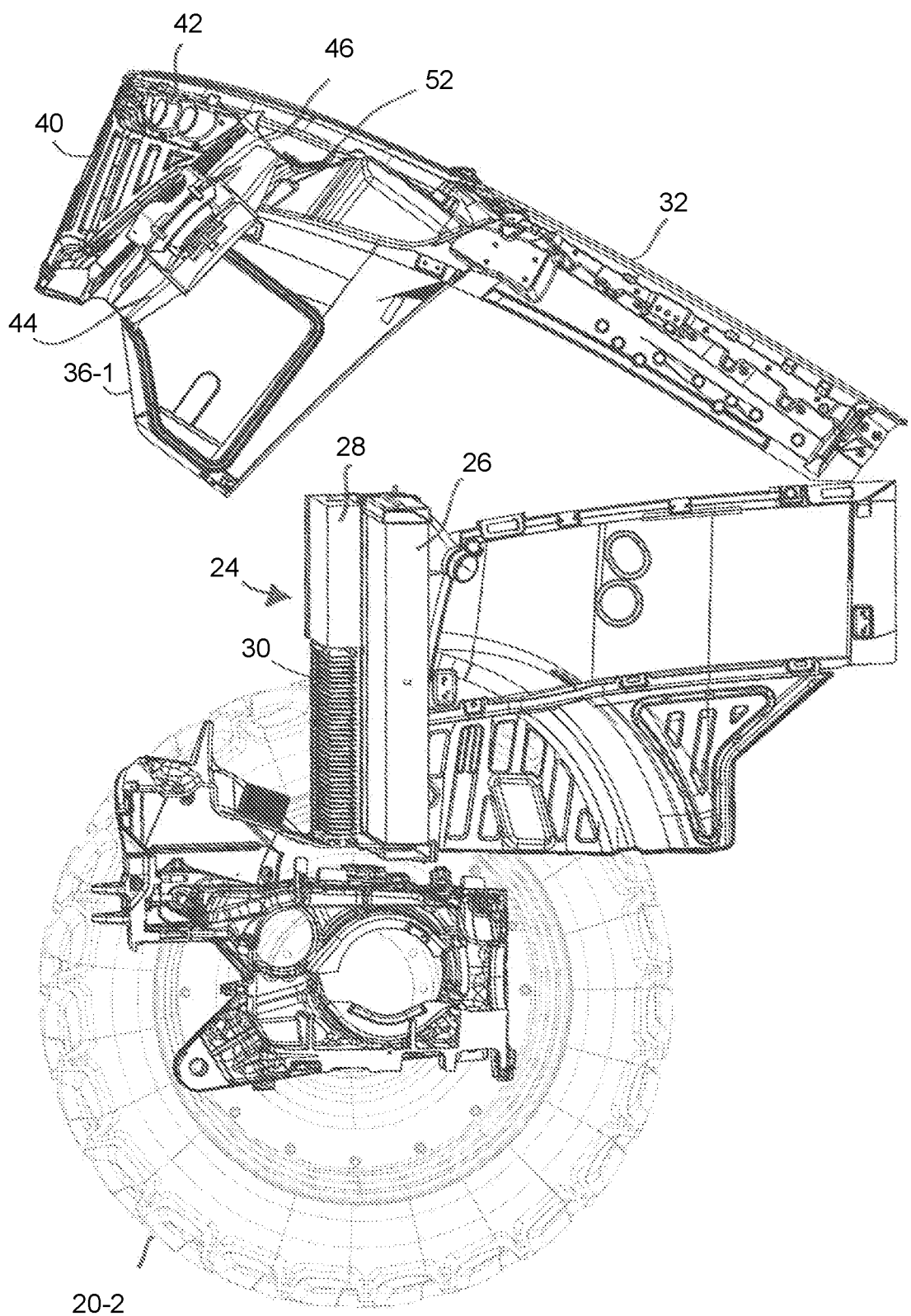
FIG. 5 is a perspective view of the vertical section of FIG. 4, but shown with the hood in an open position.

A hood 32 is positioned in front of the cab 14 to cover and protect the front end installation. In the illustrated embodiment, the hood 32 is pivotable about a transverse pivot axis 'P' (FIG. 3) positioned immediately in front of the cab and behind the engine 16 with respect to the normal forward direction of travel. However, in an alternative arrangement, the hood 32 may pivot further forward than shown, for example in front of the engine 16. The hood 32 is mounted relative to the frame 12 for movement around pivot axis P between a closed position (FIGS. 1, 2, and 4) and an open position (FIGS. 2, 3, and 5).

The hood 32 comprises a top cover portion 34 that extends forward from the pivot axis P to the front of the tractor 10, and two side covers 36-1, 36-2 that are each attached to, and extend downward from the top cover portion 34. The side covers 36-1, 36-2 preferably extend from the front of the tractor 10 only part way to the cab 14, and preferably stop short of the engine 16. The side covers 36-1, 36-2 are located between the front wheels 20-1, 20-2 when the hood 32 is closed. There may be fixed side covers 38, not movable with the hood 32, attached to the frame 12 on either side of the engine housing. The rear edges of the side covers 36-1, 36-2 preferably have a profile that marries up with a front edge of the fixed side cover 38 when the hood 32 is closed. The side covers 36-1, 36-2 may be perforated to allow a cooling airstream to pass through.

In the closed position, the hood 32 covers the engine 16 and cooling package 24, serving to protect these components from damage and ingress of particulate matter. In the illustrated embodiment, the cooling package 24 is disposed between the side covers 36-1, 36-2 when the hood 32 is closed. However, in alternative embodiments, at least a part of the cooling package 24 is disposed rearward of the side covers 36-1, 36-2.

A front grill 40 extends transversely between front edges of the side covers 36-1, 36-2, downward from a front edge of the top cover portion 34, and presents a generally forward-facing perforated surface through which a cooling airstream can pass. In the illustrated embodiment, headlights 42 are fitted to or above the front grill 40.

A latching mechanism at the front of the hood 32, such as at the base of the front grill 40, may secure the hood 32 closed during operation. Moreover, biasing means such as gas struts may bias the hood 32 upward and maintain the hood 32 in the open position without the need for the operator to lift and hold it in place.

A fan 44 is mounted to an inside surface of the hood 32, wherein the inside surface is defined as the surface that faces inward towards the front end installation when the hood 32 is closed. In one embodiment, the fan 44 is mounted to the hood 32 between the side covers 36-1, 36-2. The fan 44 has a fan surround or housing 46 to which an impellor 48 is journaled on a fan axis 'f' (FIG. 4). The fan housing 46 is fastened to the side covers 36-1, 36-2 and/or to the top cover portion 34 to retain a fixed positional relationship with the hood 32.

The fan 44 is angled so that the fan axis f is aligned generally fore-and-aft (or longitudinally). However, it should be appreciated that, as in the illustrated embodiment (see FIG. 4), the fan axis f may be disposed at a non-zero angle α with respect to the vehicle horizontal 'L' when the hood 32 is closed. When the hood 32 is closed, the fan 44 is positioned in an operable position (as shown in FIGS. 2 and 4) to generate a generally rearward cooling airstream through the cooling package 24 as designated generally by arrow 'X' (FIG. 2), drawing air through the front grill 40. However, it should be understood that, in an alternative embodiment, the fan 44 may instead be driven in the opposite direction to draw air through the cooling package 24.

When the hood 32 is closed, the fan 44 preferably separates a low pressure compartment 'C' (FIG. 2) in front or upstream of the fan 44, and a high pressure compartment 'D' behind or downstream of the fan 44. To maintain a sufficient pressure differential to force the cooling airstream through the cooling package 24, one or more seals are provided around the periphery of the fan housing 46. In one example, a seal extends, preferably continuously, around the side and top edges of the fan housing 46 forming a substantially airtight seal between the fan housing 46 and the underside of the hood 32. The seal may optionally serve to fasten the fan 44 to the hood. As such, the side covers 36-1, 36-2 may fulfil a sealing function in addition to serving as a protective cover. A bottom seal may also be provided between a bottom edge of the fan housing 46 and a floor part 50 of the frame 12.

One or both of the seals may be formed by one or more shroud members 48, 52 which also serve to guide the cooling air into the fan 44. In the illustrated embodiment, an upper shroud member 48 provides the seal between the fan housing 46 and an inside surface of the hood 32. A lower shroud member 52 is mounted along a lower edge of the fan housing 46 and, when the hood 32 is in the closed position, provides a seal with the floor part 50.

Although shown as being mounted to the fan housing 46, in an alternative embodiment the lower seal or shroud member 52 may instead be fixed to the frame 12 to form a seal with the fan 44 when the hood 32 is in the closed position.

The fan 44 may be powered electrically, hydraulically, or pneumatically, by way of example, with the supply lines for such being fastened to the underside of the hood 32 and configured to move therewith.

Being mounted to the hood 32, the fan 44 is raised clear of the operable position when the hood 32 is opened, as best illustrated in FIGS. 3 and 5. Advantageously, this may allow better access to the cooling package 24 and engine 16 for the operator to carry out cleaning and maintenance. In the embodiment as shown, the fan 44 is positioned in front of the cooling package 24 in the operable position when the hood 32 is closed and is raised above the cooling package 24 when the hood 32 is opened.

Figure 7:
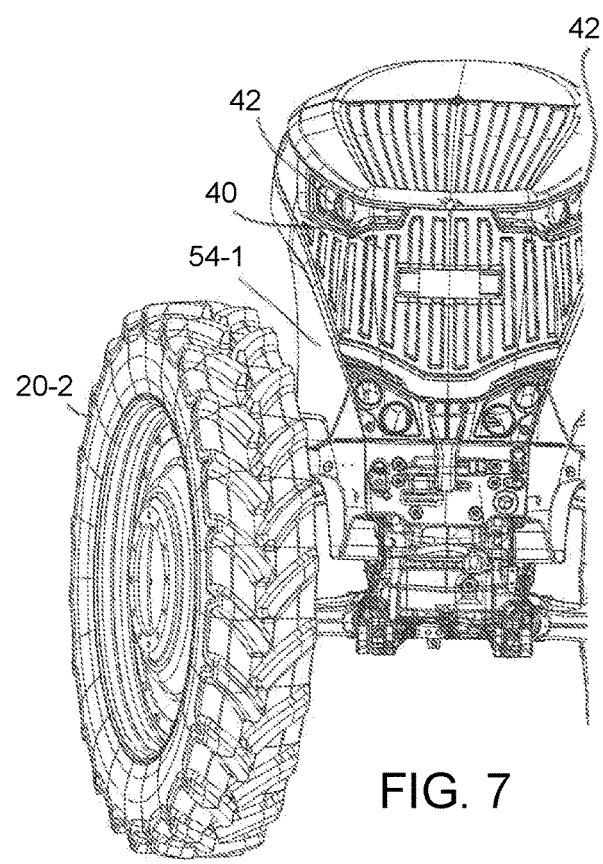

A further advantage delivered by mounting the fan 44 to the hood 32 is that the side covers 36-1, 36-2 can taper inward below and/or in front of the fan 44, thereby giving more freedom of movement to the steerable wheels 20. Best seen in FIGS. 6 and 7, the tapered regions 54-1, 54-2 of the side covers 36-1, 36-2 permit the swept envelope of the wheels 20 to encroach underneath and/or in front of the fan 44 and allow for a greater range of steering angles. It should be understood that, in this regard, the term 'taper' is meant to encompass sloping or angling inwardly (or transversely) of the side covers 36 to a width that is less than the width of the fan 44.

In summary, an embodiment relates to a pivotable engine hood for a utility tractor with an integrated ventilation system in the form of a fan for example. The fan is lifted together with the engine hood, when the hood is opened. When the hood is closed, the ventilation system returns to its position in front of the engine. The hood comprises side panels which are connected to it and can be lifted together with the hood. The fan may be mounted between the side panels in a sealed manner so as to maintain a low pressure zone and a high pressure zone either side of the fan.

All references cited herein are incorporated herein in their entireties. If there is a conflict between definitions herein and in an incorporated reference, the definition herein shall control.

From reading the present disclosure, other modification will be apparent to persons skilled in the art. Such modifications may involve other features which are already known in the field of utility vehicles and front end installations therefore, and which may be used instead of or in addition to features already described herein.

What is claimed is:

1. A utility vehicle, comprising:
an engine;
a heat exchanger operable to cool a fluid;
a fan; and
a hood arranged to pivot between a closed position and an open position around a transverse pivot axis with respect to a normal forward direction of travel, wherein the fan is mounted to the hood, wherein when in the closed position the hood covers the heat exchanger and the fan is positioned in an operable position to generate a cooling airstream through the heat exchanger, and when in the open position the fan is displaced from the operable position and moved away from the heat exchanger.

2. The utility vehicle of claim 1, further comprising a chassis and a cab supported on the chassis, wherein the engine and the heat exchanger are supported on the chassis in front of the cab, and wherein the hood is pivotally mounted to the chassis in front of the cab.

3. The utility vehicle of claim 2, wherein the chassis is carried on two steerable wheels, and wherein a portion of the hood is located between the two steerable wheels when the hood is in the lowered position.

4. The utility vehicle of claim 1, further comprising a power supply line connected to the fan and mounted to an inside surface of the hood.

5. The utility vehicle of claim 4, wherein the power supply line comprises a hydraulic supply line or an electric supply line.

6. The utility vehicle of claim 1, wherein the utility vehicle is an agricultural tractor, the agricultural tractor further comprising a transaxle comprising a rear axle integrated with a transmission casing, a cab mounted above the transaxle, and an engine casing housing the engine and attached to the front of the transmission casing.

7. A utility vehicle, comprising:
a chassis;
a cab supported on the chassis;
an engine supported on the chassis in front of the cab;
a heat exchanger supported on the chassis in front of the cab and operable to cool a fluid;
a hood pivotally mounted to the chassis in front of the cab, the hood arranged to pivot between a closed position and an open position, and
a fan mounted to the hood;
wherein when the hood is in the closed position, the fan is disposed in front of the heat exchanger, the hood covers the heat exchanger, and the fan is positioned in an operable position to generate a cooling airstream through the heat exchanger;
wherein when the hood is in the open position, the fan is displaced from the operable position.

8. A utility vehicle, comprising;
a chassis carried on two steerable wheels;
a cab supported on the chassis;
an engine supported on the chassis in front of the cab;
a heat exchanger supported on the chassis in front of the cab and operable to cool a fluid;
a hood pivotally mounted to the chassis in front of the cab, the hood arranged to pivot between a closed position and an open position; and
a fan mounted to the hood;
wherein the hood comprises a top cover and two side covers attached to, and extending downwardly from, the top cover, wherein the fan is mounted between the two covers;
wherein when the hood is in the closed position, a portion of the hood is located between the two steerable wheels, the hood covers the heat exchanger, and the fan is positioned in an operable position to generate a cooling airstream through the heat exchanger; and
wherein when the hood is in the open position, the fan is displaced from the operable position.

9. The utility vehicle of claim 8, wherein each of the two side covers tapers laterally inwardly below the fan to a width that is less than a width of the fan.

10. The utility vehicle of claim 9, wherein the steerable wheels define a swept envelope that is partially disposed underneath the fan.

11. The utility vehicle of claim 8, wherein each of the two side covers tapers laterally inwardly in front of the fan to a width that is less than a width of the fan.

12. The utility vehicle of claim 11, wherein the steerable wheels define a swept envelope that is partially disposed in front of the fan and under the top cover.

13. A utility vehicle, comprising:
an engine;
a heat exchanger operable to cool a fluid;
a fan; and
a hood arranged to pivot between a closed position and an open position, wherein the fan is mounted to the hood, wherein when in the closed position the hood covers the heat exchanger and the fan is positioned in an operable position to generate a cooling airstream through the heat exchanger and when in the open position the fan is displaced from the operable position;
wherein the fan comprises a fan surround and a seal disposed between an inside surface of the hood and top and side edges of the fan surround.

14. The utility vehicle of claim 13, further comprising a bottom seal between a bottom edge of the fan surround and a frame member when the hood is in the closed position.

15. A utility vehicle, comprising:
a chassis;
a cab supported on the chassis;
an engine compartment in front of the cab;
a prime mover within the engine compartment;

a heat exchanger operable to cool a fluid within the engine compartment;

a hood pivotally mounted to the chassis in front of the cab, the hood configured to pivot around a transverse pivot axis with respect to a normal forward direction of travel between a closed position and an open position; and a fan mounted to the hood;

wherein when in the closed position the hood covers the heat exchanger and the fan is positioned in an operable position to generate a cooling airstream through the heat exchanger, and when in the open position the fan is displaced from the operable position and is moved away from the heat exchanger.

\* \* \* \* \*